(12) United States Patent
Waumans et al.

(10) Patent No.: US 8,975,211 B2
(45) Date of Patent: Mar. 10, 2015

(54) SECURITY DOCUMENTS AND COLOUR LASER MARKING METHODS FOR SECURING THEM

(75) Inventors: Bart Waumans, Puurs (BE); Ingrid Geuens, Emblem (BE); Paul Callant, Edegem (BE); Hubertus Van Aert, Pulderbos (BE)

(73) Assignee: Agfa-Gevaert N.V., Mortsel (BE)

( * ) Notice: Subject to any disclaimer, the term of this patent is extended or adjusted under 35 U.S.C. 154(b) by 23 days.

(21) Appl. No.: 13/885,750

(22) PCT Filed: Dec. 2, 2011

(86) PCT No.: PCT/EP2011/071605
§ 371 (c)(1),
(2), (4) Date: May 16, 2013

(87) PCT Pub. No.: WO2012/076406
PCT Pub. Date: Jun. 14, 2012

(65) Prior Publication Data
US 2013/0233932 A1    Sep. 12, 2013

Related U.S. Application Data

(60) Provisional application No. 61/421,218, filed on Dec. 9, 2010.

(30) Foreign Application Priority Data

Dec. 7, 2010    (EP) .................................... 10193894

(51) Int. Cl.
| | | |
|---|---|---|
| *B41M 3/14* | (2006.01) | |
| *B41M 5/26* | (2006.01) | |
| *B41M 5/327* | (2006.01) | |
| *B41M 5/337* | (2006.01) | |
| *B42D 15/00* | (2006.01) | |
| *B41J 2/44* | (2006.01) | |
| *B41M 5/30* | (2006.01) | |
| *B32B 27/36* | (2006.01) | |
| *B32B 27/08* | (2006.01) | |
| *B42D 25/41* | (2014.01) | |
| *B42D 25/00* | (2014.01) | |
| *B41M 5/333* | (2006.01) | |

(52) U.S. Cl.
CPC .............. *B41M 5/327* (2013.01); *B41M 5/267* (2013.01); *B41M 3/142* (2013.01); *B41M 5/30* (2013.01); *B41M 5/3336* (2013.01); *B41M 5/3372* (2013.01); *B41M 5/3375* (2013.01); *B42D 2033/20* (2013.01); *B42D 2033/30* (2013.01); *B42D 2033/32* (2013.01); *B32B 27/36* (2013.01); *B32B 2425/00* (2013.01); *B32B 27/08* (2013.01); *B32B 2255/10* (2013.01); *B32B 2255/26* (2013.01); *B32B 2307/40* (2013.01); *B32B 2307/412* (2013.01); *B32B 2307/518* (2013.01); *B42D 25/41* (2014.10); *B42D 25/00* (2014.10); *Y10S 430/146* (2013.01)

USPC ........... 503/208; 430/200; 430/945; 347/232; 283/84; 283/95; 283/109

(58) Field of Classification Search
CPC ...... B41M 3/142; B41M 5/267; B41M 5/327; B41M 5/3375; B42D 15/0013; B42D 2031/10; B42D 2033/20; B41J 2/442
USPC ........... 503/201, 208; 430/200, 945; 347/232; 283/84, 95, 109
See application file for complete search history.

(56) References Cited

U.S. PATENT DOCUMENTS

| | | |
|---|---|---|
| 3,649,336 A | 3/1972 | Van Paesschen et al. |
| 4,663,518 A | 5/1987 | Borror et al. |
| 4,720,449 A | 1/1988 | Borror et al. |
| 4,742,042 A | 5/1988 | Hiraishi et al. |
| 5,200,947 A | 4/1993 | Satake et al. |
| 5,243,052 A | 9/1993 | Taylor et al. |
| 5,410,335 A | 4/1995 | Sawano et al. |
| 6,017,972 A | 1/2000 | Harris et al. |
| 6,100,009 A | 8/2000 | Obayashi et al. |
| 7,097,899 B2 | 8/2006 | Daems et al. |

(Continued)

FOREIGN PATENT DOCUMENTS

| | | |
|---|---|---|
| EP | 0174054 A2 | 3/1986 |
| EP | 0605149 A2 | 7/1994 |

(Continued)

OTHER PUBLICATIONS

International Preliminary Report on Patentability in corresponding International Patent Application No. PCT/EP2011/071605, mailed Jun. 12, 2013.

(Continued)

*Primary Examiner* — Bruce H Hess
(74) *Attorney, Agent, or Firm* — Leydig, Voit & Mayer, Ltd.

(57) ABSTRACT

A security document precursor including, in order, at least: a) a transparent biaxially stretched polyethylene terephthalate foil; b) a colorless color forming layer containing at least an infrared absorber, a color forming component and a polymeric binder; and c) a polymeric support; wherein the colorless color forming layer contains at least one component forming a compound having a melting temperature of less than 20° C. upon laser marking the colorless color forming layer with an infrared laser. Methods for securing a security document using the security document precursor are also disclosed.

15 Claims, No Drawings

(56) References Cited

U.S. PATENT DOCUMENTS

| | | |
|---|---|---|
| 7,158,145 B1 | 1/2007 | Fannasch et al. |
| 7,980,596 B2 | 7/2011 | Labrec |
| 2001/0044553 A1 | 11/2001 | Kabashima et al. |
| 2003/0183695 A1 | 10/2003 | Labrec et al. |
| 2005/0001419 A1 | 1/2005 | Levy et al. |
| 2006/0276335 A1 | 12/2006 | Tsuboi et al. |
| 2008/0076065 A1 | 3/2008 | Bennett et al. |
| 2008/0224462 A1 | 9/2008 | Dubner et al. |
| 2008/0238086 A1 | 10/2008 | Geuens et al. |
| 2010/0099556 A1 | 4/2010 | Vetterling et al. |

FOREIGN PATENT DOCUMENTS

| | | |
|---|---|---|
| EP | 0 739 748 | 10/1996 |
| EP | 1452334 A2 | 9/2004 |
| EP | 2 181 858 A1 | 5/2010 |
| EP | 2 199 100 A1 | 6/2010 |
| GB | 811066 | 3/1959 |
| GB | 1441591 | 7/1976 |
| JP | 61175077 A | 8/1986 |
| WO | WO 2005/025885 A1 | 3/2005 |
| WO | WO 2006/042714 A1 | 4/2006 |
| WO | WO 2008/084315 A2 | 7/2008 |
| WO | WO 2009/140083 A2 | 11/2009 |
| WO | WO 2012/076354 A1 | 6/2012 |
| WO | WO 2012/076354 A2 | 6/2012 |
| WO | WO 2012/076488 A1 | 6/2012 |
| WO | WO 2012/076493 A1 | 6/2012 |

OTHER PUBLICATIONS

International Search Report in corresponding International Patent Application No. PCT/EP2011/071605, mailed Feb. 28, 2012.

SECURITY DOCUMENTS AND COLOUR LASER MARKING METHODS FOR SECURING THEM

CROSS-REFERENCE TO RELATED APPLICATIONS

The present application is the U.S. National Phase of PCT/EP2011/071605, filed Dec. 2, 2011, claiming the benefit of European Patent Application No. 10193894.2, filed Dec. 7, 2010, and U.S. Provisional Patent Application No. 61/421,218, filed Dec. 9, 2010; the disclosures of the '605, '894 and '218 applications are incorporated by reference.

TECHNICAL FIELD

This invention relates to security documents and methods for securing them by colour laser marking, so that the information on the document cannot be altered or modified unnoticed and that the cards cannot be reused fraudulently.

BACKGROUND ART

Security cards are widely used for various applications such as identification purposes (ID cards) and financial transfers (credit cards). Such cards typically consist of a laminated structure consisting of various paper or plastic laminates and layers wherein some of them may carry alphanumeric data and a picture of the card holder. So called 'smart cards' can also store digital information by including an electronic chip in the card body.

A principal objective of such security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking, a colour change is observed by local heating of material, while in laser engraving material is removed by laser ablation.

US 2005001419 (DIGIMARK) discloses a colour laser engraving method and a security document including an opaque surface layer and one or more coloured sub-layers. A laser provides openings in the surface layer to expose the colour of the sub-layer thereby creating colour images and text.

WO 2009/140083 (3M) discloses methods to generate a colour image in a multilayer article containing at least one thermally activatable layer coated from a composition including a non-linear light to heat converter, a leuco dye, a thermal acid generator and a solvent. A colour image is formed in the colour forming layer upon activation with non-linear light beam radiation (300-1500 nm).

U.S. Pat. No. 7,158,145 (ORGA SYSTEMS) discloses a three-wavelength system (440, 532 and 660 nm) for applying coloured information to a document by means of wavelength-selective bleaching of chromophoric particles in a layer close to the surface.

U.S. Pat. No. 4,720,449 (POLAROID) discloses a thermal imaging method for producing colour images on a support carrying at least one layer of a colourless compound, such as di- or triarylmethane, by direct application of heat or by conversion of electromagnetic radiation into heat. The laser beam may have different wavelengths, typically in a range above 700 nm with at least about 60 nm apart so that each imaging layer may be exposed separately to convert a colourless triarylmethane compound into a coloured form, such as yellow, magenta, cyan or black, by controlling the focusing depth of the laser beam source to each colour forming layer. The colour forming compositions include di- or triarylmethane compounds, infrared absorbers, acidic substances and binders.

U.S. Pat. No. 4,663,518 (POLAROID) discloses a laser printing method for activating heat sensitive image forming dyes in three different layers on a support to provide an identification card containing a coloured pictorial image of the card holder, coloured text and machine readable digital code.

Laser marking can be categorized into the "additive" imaging techniques, comparable to e.g. inkjet, while laser engraving is a "subtractive" imaging technique. Often in falsifying security cards, the addition of information has been proven to be easier than the subtraction of information. For example, it is possible to completely change a photograph of the card holder by adding more hair, a moustache and glasses. Many approaches have been developed to prevent such falsification.

One approach involves a change of the information content on the security document. For example, WO 2008/084315 (AXALTO) discloses a secure identification document comprising a first set of identification data and a second set of identification data obtained by duplicating the first set of identification data, which takes the form of a reverse image of the first set of identification data. A disadvantage of including an image and its reverse image is the reduction of space available for other type of information.

Another approach involves the addition of security features such as, for example, a watermark as U.S. Pat. No. 7,097,899 (AGFA) or the use of a lenticular lens in US 2003183695 (DIGIMARC). Generally, the addition of such security features represents an increase in the cost of manufacturing security documents. It often also requires installing at the customer site more costly and sophisticated equipment, e.g. including a coating device, needed to assemble the security documents.

Since methods for falsification of security documents continue to develop and improve, it remains a constant battle to protect security documents against falsification and counterfeiting. Therefore a need exists to provide simple and cost-effective methods for securing documents.

SUMMARY OF INVENTION

In order to overcome the problems described above, preferred embodiments of the present invention provide a security document precursor as defined herein. This security document precursor allowed a surprisingly simple method based on blister formation to visually detect tampering of the security document.

The specific composition of the security document precursor, wherein the colourless colour forming layer is sandwiched between the transparent biaxially stretched polyethylene terephthalate foil and the polymeric support that are both practically impermeable for the compound having a melting temperature lower than room temperature (20° C.), will disturb a second laser marking for falsifying the security document by the formation of clearly visible blisters in the already laser marked areas.

Further advantages and embodiments of the present invention will become apparent from the following description.

DEFINITIONS

The term "graphical data" as used in disclosing the present invention means any graphical representation, e.g. a picture of a person, a drawing, etc.

The term "information" as used in disclosing the present invention means any alphanumeric data, e.g. name, place of birth, date of birth, etc.

The term "image" as used in disclosing the present invention means any graphical data and information. The image on a security document preferably varies at least partially from one security document to another one.

The term "security document" as used in disclosing the present invention means a document which contains the required image, e.g. a valid passport or identification card, and is ready for use.

The term "security document precursor" as used in disclosing the present invention means a document not containing all the required components of the security document, e.g. a layer or a security feature, and/or not containing the required image of the security document.

The term "visible spectrum" as used in disclosing the present invention means the electromagnetic spectrum from 400 nm to 700 nm.

The term "polymeric foil" as used in disclosing the present invention, means a self-supporting polymer-based sheet, which may be associated with one or more adhesion layers e.g. subbing layers. Foils are generally manufactured through extrusion.

The term "support" as used in disclosing the present invention, means a self-supporting polymer-based sheet, which may be transparent but is preferably opaque and which may be associated with one or more adhesion layers e.g. subbing layers. Supports are generally manufactured through extrusion.

The term "layer", as used in disclosing the present invention, is considered not to be self-supporting and is manufactured by coating it on a support or a polymeric foil.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) is used in the production of cards.

"PET-C" is an abbreviation for crystalline PET, i.e. a biaxially stretched polyethylene terephthalate. Such a polyethylene terephthalate support or foil has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "substituted" in, for example substituted alkyl, means that the substituent on alkyl contains at least one atom different from carbon or hydrogen. The substituent may be a single atom (e.g. a halogen) or a group of atoms containing at least one atom different from carbon or hydrogen (e.g. an acrylate group).

The term "chlorinated ethylene", as used in disclosing the present invention, means ethylene substituted with at least one chlorine atom e.g. vinyl chloride, vinylidene chloride, 1,2-dichloro-ethylene, trichloroethylene and tetrachloroethylene. Trichloroethylene and tetrachloroethylene are all much more difficult to polymerize than vinyl chloride or vinylidene chloride.

A leuco dye is a well-known colour forming compound whose molecules can acquire two forms, one of which is colourless. An example of a leuco dye is crystal violet lactone, which in its lactone form is colourless, but when it is protonated becomes intensely violet.

Security Document and Precursors

A security document precursor according to the present invention includes, in order, at least:

a) a transparent biaxially stretched polyethylene terephthalate foil;

b) a colourless colour forming layer containing at least an infrared absorber, a colour forming component and a polymeric binder; and c) a polymeric support;

wherein the colourless colour forming layer contains at least one component forming a compound having a melting temperature of less than 20° C. upon laser marking the colourless colour forming layer with an infrared laser.

The component forming a compound having a melting temperature of less than 20° C. is preferably a colourless dye-precursor which forms a coloured dye by fragmentation.

The component forming a compound having a melting temperature of less than 20° C. is preferably a hydrogen donor precursor.

The component forming a compound having a melting temperature of less than 20° C. is preferably a thermal acid generating component.

In a preferred embodiment, the compound having a melting temperature of less than 20° C. includes $CO_2$ and/or an alkene.

The security document according to the present invention includes a security document precursor as defined above.

The security document is preferably selected from the group consisting of a passport, a personal identification card and a product identification document.

In another preferred embodiment, the security document is a product identification document which is attached to the packaging material of the product or to the product itself.

The security document preferably also contains electronic circuitry, more preferably the electronic circuitry includes a RFID chip with an antenna and/or a contact chip. The security document is preferably a "smart card", meaning an identification card incorporating an integrated circuit. In a preferred embodiment the smart card includes a radio frequency identification or RFID-chip with an antenna.

In one embodiment, the security document precursor already includes a RFID chip with an antenna and/or a contact chip. In another embodiment, room has been foreseen in the security document precursor to incorporate a RFID chip with an antenna and/or a contact chip.

The security document and its precursor preferably have a format as specified by ISO 7810. ISO 7810 specifies three formats for identity cards: ID-1 with the dimensions 85.60 mm×53.98 mm, a thickness of 0.76 mm is specified in ISO 7813, as used for bank cards, credit cards, driving licences and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1.

Methods for Securing Security Documents

A method for securing a security document according to the present invention includes the steps of:

1) providing a security document precursor including, in order, at least:
   a) a transparent biaxially stretched polyethylene terephthalate foil;
   b) a colourless colour forming layer containing at least an infrared absorbing component, a colour forming component and a polymeric binder component; and
   c) a polymeric support; and
2) laser marking the colourless colour forming layer with an infrared laser,
wherein the colour forming layer contains at least one component forming a compound having a melting temperature of less than 20° C. upon laser marking the layer with an infrared laser.

The component forming a compound having a melting temperature of less than 20° C. in the method for securing a security document is preferably selected from the group consisting of a colourless dye-precursor which forms a coloured dye by fragmentation, a hydrogen donor precursor and a thermal acid generating component.

The colourless colour forming layer includes an infrared absorbing component which is capable of converting the infrared radiation of the infrared laser into heat which triggers the colour formation reaction. Hence, the laser emission wavelength of the infrared laser preferably matches the absorption maximum of the infrared absorbing component within 40 nm, more preferably within 25 nm.

Preferably, the infrared laser used is an optically pumped semiconductor laser or a solid state Q-switched laser.

A semiconductor laser is particularly preferred because the device is compact and inexpensive. Most semiconductor lasers are laser diodes, which are pumped with an electrical current in a region where an n-doped and a p-doped semiconductor material meet. However, there are also optically pumped semiconductor lasers, where carriers are generated by absorbed pump light. Optically pumped semiconductor lasers have the advantage of unique wavelength flexibility, different from any other solid-state based laser. The fundamental near-IR output wavelength is determined by the structure of the InGaAs (semiconductor) gain chip, and can be set anywhere between 920 nm and 1154 nm. This allows a perfect match between the laser emission wavelength and the absorption maximum of the infrared absorbing component.

The infrared laser is most preferably a solid state Q-switched laser. Q-switching is a technique by which a laser can be made to produce a pulsed output beam. The technique allows the production of light pulses with extremely high peak power, much higher than would be produced by the same laser if it were operating in a continuous wave (constant output) mode, Q-switching leads to much lower pulse repetition rates, much higher pulse energies, and much longer pulse durations.

In one embodiment, the infrared laser is used in a continuous wave mode.

In another embodiment, the infrared laser is used in a pulsed mode.

Infrared lasers are widely commercially available. An example of a solid state Q-switched laser is the Matrix™ 1064 laser from COHERENT emitting at 1064 nm and capable of producing an average power of 7 Watt at a pulse repetition rate of 10 kHz.

Colourless Colour Forming Layer

The security document precursor according to the present invention has at least one colourless colour forming layer including at least:
a) an infrared absorber;
b) a colour forming compound; and
c) a polymeric binder. The security document may further include d) a thermal acid generating compound.

The colourless colour forming layer(s) can be coated onto the polymeric foil by any conventional coating technique, such as dip coating, knife coating, extrusion coating, spin coating, slide hopper coating and curtain coating. Preferably the colourless colour forming layer is coated with a slide hopper coater or a curtain coater, more preferably coated onto the transparent polymeric foil including a subbing layer.

The dry thickness of the colourless colour forming layer is preferably between 5 and 40 g/m$^2$, more preferably between 7 and 25 g/m$^2$, and most preferably between 10 and 15 g/m$^2$.

The security document according to present invention contains at least one colourless colour forming layer containing an infrared absorber, a polymeric binder and a colour forming compound, but preferably contains two, three or more colourless colour forming layers for producing a multi-coloured security document.

The security document precursor according to present invention is preferably a multi-coloured article containing at least three colourless colour forming layers containing different infrared absorbers and colour forming compounds The infrared absorber not only delivers the heat for the colour forming action, but also has the advantage that there is no or minimal absorption in the visible spectrum and thus there is no or minimal interference with the colours formed by the one or more colourless colour forming layers. This also allows having, for example, a pure white background in a security document.

In addition to the colourless colour forming layer containing laser marked graphical data having a blue or cyan colour and laser marked information having a black colour, preferably the security document contains two other colourless colour forming layers for forming a magenta respectively a yellow image or for forming a red respectively a green image, since most colour management systems for producing colour images are based on either a CMY or RGB colour reproduction.

Colour Forming Components and Hydrogen Donor Precursors

Colour forming compounds are colourless or slightly yellowish compounds which react into a coloured form.

The colour forming compound is preferably present in the colourless colour forming layer in an amount of 0.5 to 5.0 g/m$^2$, more preferably in an amount of 1.0 to 3.0 g/m$^2$.

For performing the method of colour laser marking according to the present invention, the following two reaction mechanisms and the colour forming compounds involved are suitable to form a coloured dye.

1. Fragmentation of a Colourless Dye-Precursor

The reaction mechanism can be represented by:

Colourless dye-FG→ Coloured Dye wherein FG represents a fragmenting group.

Such a reaction mechanism is explained in more detail by U.S. Pat. No. 5,243,052 (POLAROID) disclosing the colour formation by fragmentation of a mixed carbonate ester of a quinophthalone dye and a tertiary alkanol containing not more than about 9 carbon atoms.

The fragmentation of a colourless dye-precursor may be catalyzed or amplified by acid generating agents. The dyes G-(18) to G-(36) disclosed by U.S. Pat. No. 6,100,009 (FUJI) are catalyzed or amplified by polymeric acid generating agents based on A-(1) to A-(52), which are also suitable as acid generating agents in the present invention.

Another preferred colourless dye-precursor is the leuco dye-precursor (CASRN104434-37-9) shown in EP 174054 A (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye-precursor may be a two-step reaction mechanism represented by:

Leuco-dye-FG➡ [Leuco-dye]➡ Coloured Dye wherein FG represents a fragmenting group.

The fragmentation of a colourless leuco dye-precursor may be catalyzed or amplified by acids and acid generating agents. The leuco dye-precursors G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye after Fragmentation of a H-Donor-Precursor

The reaction mechanism can be represented by:

Leuco-dye+H-donor-FG➡ Leuco-dye+H-donor➡ Coloured Dye wherein FG represents a fragmenting group.

A preferred H-donor-FG compound includes an ester group as part of its chemical structure (the rest of the compound is represented by the group T) which by laser heating forms a carboxylic acid group:

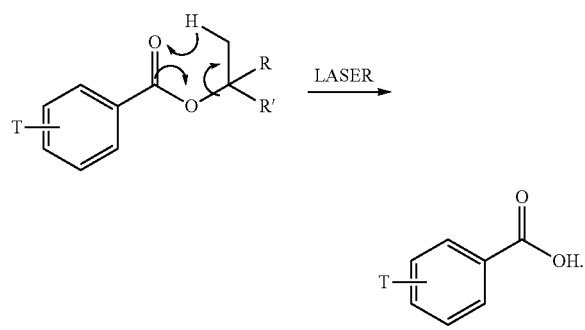

A more preferred H-donor-precursor includes a carbonate group, e.g. a tBOC group, as part of its chemical structure (the rest of the compound is represented by the group T) which by laser heating forms a phenol group:

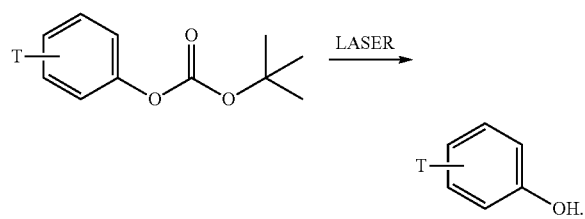

Preferred carbonate groups are given on page 8 of EP 605149 A (JUJO PAPER). In a preferred embodiment, the H-donor-FG compound contains 2 carbonate groups.

The most preferred H-donor-FG compound is:

HD-1

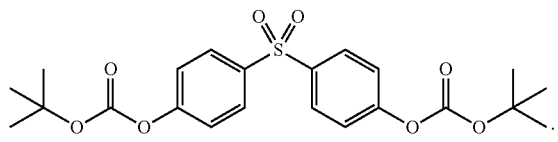

The synthesis of compound HD-1 (CASRN 129104-70-7) is given on page 31 of EP 605149 A (JUJO PAPER) for the compound (19).

The fragmentation of the colourless dye-precursor, the colourless leuco dye precursor and hydrogen donor-precursor in the colourless colour forming layer all lead to the formation of a compound having a melting temperature lower than room temperature (20° C.). In the present invention the formation of such a compound is used as a security feature. The compound having a melting temperature lower than room temperature will disturb a second laser marking (falsification of the security document) by the formation of clearly visible blisters in laser marked areas. A blister is formed because the transparent biaxially stretched polyethylene terephthalate foil prevents the compound having a melting temperature lower than room temperature from evaporating out of the security document precursor.

In a preferred embodiment, the compound having a melting temperature lower than room temperature is $CO_2$ and/or an alkene. The alkene preferbly includes isobutene.

The colour formation according to the second mechanism is a two-component reaction involving a leuco dye and a hydrogen donor-precursor, while the first two reaction mechanism is a one-component reaction. The advantage of using a two-component reaction for the colour formation is that the stability, especially the shelf-life stability, can be enhanced. The probability of undesired colour formation due to environment heating is decreased since the first reaction mechanism above is also a two step reaction involving first the formation of the H-donor followed by a reaction of the formed H-donor with the leuco dye. Therefore, the preferred colour formation mechanism is the protonation of a leuco dye after fragmentation of the H-donor-precursor since it includes both advantages of the blister formation security feature and the enhanced shelf-life stability.

In a preferred embodiment of the colourless colour forming layer, a combination is used of 4,4'-Bis(tert-butoxycarbonyloxy)diphenylsulfone (CASRN 129104-70-7) as the H-donor precursor with the leuco dye crystal violet lactone (CASRN 1552-42-7).

Infrared Absorbers

The infrared absorber used in the colourless colour forming layer of the method of colour laser marking a security document precursor according to the present invention, can be an infrared dye, an infrared organic pigment and an inorganic infrared pigment, but preferably the infrared absorber is an infrared dye.

The advantage of using infrared dyes is that the absorption spectrum of an infrared dye tends to be narrower than that of an infrared pigment. This allows the production of multicoloured security documents from precursors having a plurality of colourless colour forming layers containing different infrared dyes and colour forming compounds. The infrared dyes having a different $\lambda_{max}$ can then be addressed by infrared lasers with corresponding emission wavelengths causing colour formation only in the colourless colour forming layer of the addressed infrared dye.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis (chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

Suitable inorganic infrared pigments include ferric oxide, carbon black and the like.

A preferred infrared dye is 5-[2,5-bis[2-[1-(1-methylbutyl) benz[cd]indol-2(1H)-ylidene]ethylidene]cyclopentylidene]-1-butyl-3-(2-methoxy-1-methylethyl)-2,4,6(1H,3H,5H)-pyrimidinetrione (CASRN 223717-84-8) represented by the Formula IR-1:

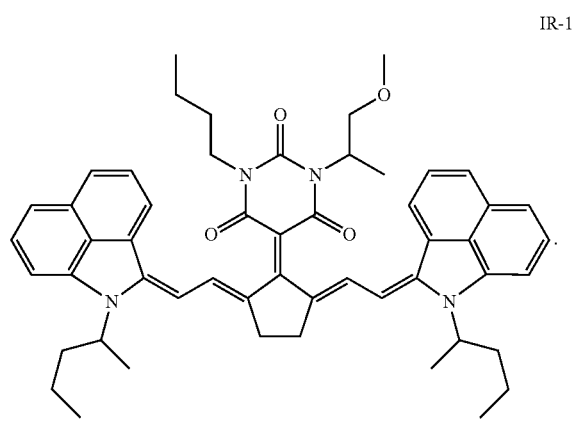 [SMILES: CCCCN1C(=O)C(=C2/C(=C/C=c3\c4cccc5cccc(c54)n3C(C)CCC)CC/C2=C\C=c2/c3cccc4cccc(c43)n2C(C)CCC)C(=O)N(C(C)COC)C1=O]

IR-1

The infrared dye IR-1 has an absorption maximum $\lambda_{max}$ of 1052 nm making it very suitable for a Nd-YAG laser having an emission wavelength of 1064 nm.

The infrared red absorber is preferably present in the colourless colour forming layer in an amount of 0.05 to 1.0 g/m$^2$, more preferably in an amount of 0.1 to 0.5 g/m$^2$.

Thermal Acid Generating Component

In one preferred embodiment, the component forming a compound having a melting temperature of less than 20° C. is a thermal acid generating component.

The fragmentation of a colourless leuco dye-precursor in the colourless colour forming layer of the method of colour laser marking a security document precursor according to the present invention may be catalyzed or amplified by acids and acid generating agents.

Suitable thermal acid generating agents may be the polymeric acid generating agents based the ethylenically unsaturated polymerizable compounds A-(1) to A-(52) disclosed by U.S. Pat. No. 6,100,009 (FUJI) and herein incorporated as a specific reference.

Suitable non-polymeric acid generating agents are the compounds A-(1) to A-(52) disclosed by U.S. Pat. No. 6,100,009 (FUJI) lacking the ethylenically unsaturated polymerizable group.

The thermal acid generating agent is preferably present in the amount of 10 to 20 wt %, more preferably 14 to 16 wt % based on the total dry weight of the colourless colour forming layer.

Polymeric Binders

In principle any suitable polymeric binder that does not prevent the colour formation in the colourless colour forming layer of the method of colour laser marking a security document precursor according to the present invention may be used. The polymeric binder may be a polymer, a copolymer or a combination thereof.

In a preferred embodiment, especially where the colourless colour forming layer includes a hydrogen donor-precursor and a leuco dye as the colour forming compound, the polymeric binder is a polymer or a copolymer of a chlorinated ethylene. The polymeric binder preferably includes at least 85 wt % of a chlorinated ethylene and 0 wt % to 15 wt % of vinyl acetate both based on the total weight of the polymeric binder. The polymeric binder preferably includes vinyl chloride as the chlorinated ethylene, and optionally vinylidene chloride as a second chlorinated ethylene.

In the most preferred embodiment of the invention, the polymeric binder includes at least 90 wt % of vinyl chloride based on the total weight of the polymeric binder.

The polymeric binder preferably includes at least at least 95 wt % of vinyl chloride and vinylacetate based on the total weight of the polymeric binder.

The polymeric binder is preferably present in the colourless colour forming layer in an amount of 5 to 30 g/m$^2$, more preferably in an amount of 7 to 20 g/m$^2$.

In the most preferred embodiment, the colourless colour forming layer in the method of colour laser marking a security document precursor according to the present invention includes 4,4'-Bis(tert-butoxycarbonyloxy)diphenylsulfone as hydrogen donor-precursor and crystal violet lactone as the colour forming compound and a copolymer of a chlorinated ethylene as polymeric binder.

Transparent Biaxially Stretched Polyethylene Terephthalate Foils

In the present invention, the colourless colour forming layer containing an infrared absorber, a polymeric binder and a colour forming compound is preferably coated on the biaxially stretched polyethylene terephthalate foil, optionally provided with a subbing layer. The transparent biaxially stretched polyethylene terephthalate foil traps the compound having a melting temperature lower than room temperature, formed upon laser marking the layer with an infrared laser, inside the security document. Blister formation occurs on laser heating areas of the security document containing the compound having a melting temperature lower than room temperature.

The transparency of the biaxially stretched polyethylene terephthalate foil is required so that the infrared laser light can reach the colourless colour forming layer and that information and graphical data, e.g. security print and guilloches, can be observed in and underneath the laser marked colourless colour forming layer(s).

Another advantage of using a biaxially stretched polyethylene terephthalate foil as the transparent polymeric foil is that is very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use. PVC (polyvinylchloride) is the most widely used material for plastic cards but has low durability of the card body, resulting in an effective lifetime of only 1-3 years, much lower than the lifetime of the often expensive chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

The biaxially stretched polyethylene terephthalate foil (PET-C foil) should be sufficiently thick to be self-supporting, but thin enough so that it is possible to include other layers, foils and support within the format as specified for security documents, e.g. by ISO 7810 for identity cards. The thickness of the PET-C foil is preferably between 10 μm and 200 μm, more preferably between 10 μm and 100 μm, most preferably 30 μm and 65 μm.

Polymeric Supports

The support of the security document precursor according to the present invention is a polymeric support, preferably a polyethylene terephthalate support. In a preferred embodiment, the support is a biaxially stretched polyethylene terephthalate support because it has excellent properties of dimensional stability, organic solvent resistance and flexibility. The polymeric support may be provided with one or more subbing layers.

Suitable polymeric supports include supports based on polymers like cellulose acetate propionate or cellulose acetate butyrate, polyesters such as polyethylene terephthalate, such as PETG or PET-C, and polyethylene naphthalate, polyamides, polycarbonates, polyimides, polyolefins, polyvinylchlorides, polyvinylacetals, polyethers and polysulphonamides.

A plain paper support is not suitable because the compound having a melting temperature of less than 20° C. can diffuse through the paper and evaporate before the attempt of falsification takes place. Plain paper supports are thus unlike the polymeric supports mentioned in this paragraph not impermeable for the compound having a melting temperature lower than room temperature (20° C.). However, a paper support coated with a resin is considered to be a polymeric support and not a plain paper support. Suitable resin coated paper supports include polyethylene coated paper and polypropylene coated paper.

In a preferred embodiment, the security document is symmetrical, i.e. the same layers and foils are present on both sides of the support. This has the advantages that both sides can be colour lasermarked and that possible curl due to an asymmetric construction of the security document is effectively prevented.

In case of a symmetrical security document, it is possible to use a plain paper support, because the compound having a melting temperature of less than 20° C. is then trapped between at least two outermost transparent biaxially stretched polyethylene terephthalate foils. However by using a plain support, the security feature is weakened, since the compound having a melting temperature of less than 20° C. can diffuse over a larger thickness resulting in less blister formation.

The support can be transparent, translucent or opaque. In a preferred embodiment the support is an opaque support. The advantage of an opaque support, preferably of a white colour, is that any information on the security document is more easily readable and that a colour image is more appealing by having a white background.

The support preferably is a single component extrudate, but may also be co-extrudate. Examples of suitable co-extrudates are PET/PETG and PET/PC.

Also synthetic paper can be used as a polymeric support, for example, Synaps™ synthetic paper of Agfa-Gevaert NV. Other examples of useful high-quality polymeric supports for the present invention include opaque white polyesters and extrusion blends of polyethylene terephthalate and polypropylene. Also Teslin™ may be used as support.

In a preferred embodiment of the security document precursor according to the present invention, the polymeric support is polyvinyl chloride, polycarbonate or polyester, with coloured or whitened polyvinyl chloride, polycarbonate or polyester being more preferred. The polyester support is preferably polyethylene terephthalate support (PET) or polyethylene terephthalate glycol (PETG).

Instead of a coloured or whitened support, an opacifying layer can be coated onto the support. Such opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

In one embodiment of the security document according to the present invention, the support is an opacified polyvinylchloride, an opacified polycarbonate or an opacified polyester.

The manufacturing of PET-C foils and supports is well-known in the art of preparing suitable supports for silver halide photographic films. For example, GB 811066 (ICI) teaches a process to produce biaxially oriented foils of polyethylene terephthalate.

The polyethylene terephthalate substrate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate substrates and biaxially oriented films thereof of have been disclosed in, e.g. US 2008238086 (AGFA).

The support should be sufficiently thick to be self-supporting, but thin enough so that it is possible to include other layers, foils and support within the format as specified for security documents, e.g. by ISO 7810 for identity cards.

The thickness of the support is preferably between 10 μm and 200 μm, more preferably between 10 μm and 100 μm, most preferably 30 μm and 65 μm.

Subbing Layers

The polymeric foil and support may be provided with one or more subbing layers. This has the advantage that the adhesion between a layer, such as the colourless colour forming layer, and the polymeric foil or support is improved. The transparent polymeric foil preferably includes a subbing layer whereon the colourless colour forming layer is coated.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AGFA);

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g.90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m².

Organic Solvents

For coating the laser markable colourless colour forming layer, one or more organic solvents may be used. The use of an organic solvent facilitates the dissolution of the polymeric binder and specific ingredients such as the infrared dye.

A preferred organic solvent is methylethylketon (MEK) because it combines a high solubilizing power for a wide range of ingredients and it provides, on coating the colourless colour forming layer, a good compromise between the fast drying of the colourless colour forming layer(s) and the danger of fire or explosion thereby allowing high coating speeds.

Other Security Features

To prevent forgeries of identification documents, different means of securing are used. One solution consists in super-imposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

The security document according to the present invention may contain other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

A combination of the security document according to the present invention with one of the above security features increases the difficulty for falsifying the document.

EXAMPLES

Materials

All materials used in the following examples were readily available from standard sources such as ALDRICH CHEMICAL Co. (Belgium) and ACROS (Belgium) unless otherwise specified. The water used was deionized water.

CCE is Bayhydrol H 2558, a anionic polyester urethane (37.3%) from BAYER.

Resorcinol from Sumitomo Chemicals.

Par is a dimethyltrimethylolamine formaldehyde resin from Cytec industries.

PAR-sol is a 40 wt % aqueous solution of Par.

PEA is Tospearl 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in iso propanol.

MEK is an abbreviation used for methylethylketon.

UCAR is an abbreviation for a 25 wt % solution in MEK of UCAR™ VAGD Solution vinyl resin is a hydroxyl-functional, partially-hydrolyzed vinyl chloride/vinyl acetate resin from UNION CARBIDE. The copolymer has a composition of 90/4/6 wt % for vinylchloride/vinyl acetate/vinylalcohol.

Baysilon is a 1 wt % solution in MEK of the silicon oil Baysilon™ Lackadditive MA available from BAYER.

HDP is the hydrogen donor-precursor CASRN 129104-70-7 prepared according to the synthesis given on page 31 of EP 605149 A (JUJO PAPER) for the compound (19).

CVL is crystal violet lactone is CASRN 1552-42-7 available from Pharmorgana:

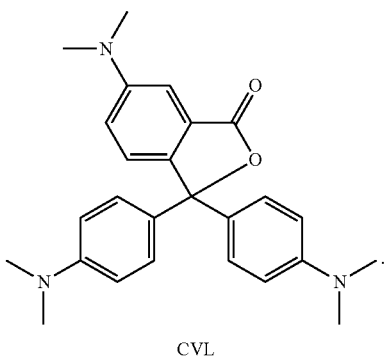

CVL

DMF is dimethylformamide.

DMA is dimethylacetamide.

THF is tetrahydrofuran.

IR-1 is a 0.15 wt % solution in MEK of the infrared dye CASRN 223717-84-8 and was prepared as described below.

The synthesis of intermediate INT-5 was carried out in a cascade mode without purification of the intermediates INT-1, INT-2, INT-3 and INT-4 as described below:

Intermediate INT-1

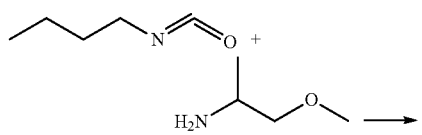

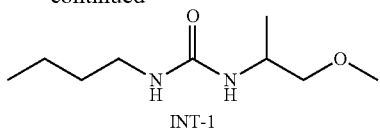
INT-1

To a solution of butyl isocyanate (1.03 eq.) in toluene (70 mL/mol) at 50° C. was added 2-amino-1-methoxy propane (1.00 eq.) over a 2 hour period. After stirring for 30 minutes, excess toluene and reagent were distilled off at 85° C./50 mbar and at 85° C./20 mbar respectively. The mixture was allowed to reach atmospheric pressure under nitrogen.
Intermediate INT-2

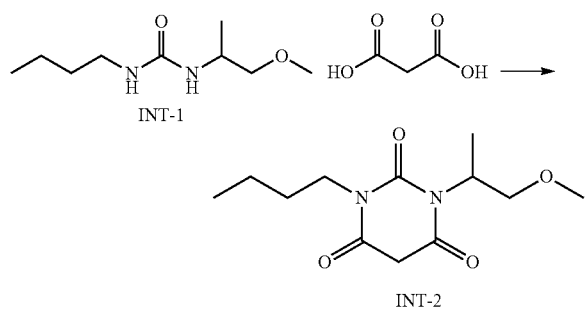

To the warm residue (INT-1) were consecutively added: acetic acid (140 mL/mol), malonic acid (1.00 eq.) and acetic anhydride (2.00 eq.). Under stirring the reaction mixture was gently warmed to 90° C. After stirring for 2.5 hours at 90° C., methanol (70 mL/mol) was added and the mixture was refluxed for 45 minutes. Subsequently, the solvents were removed at 100° C./70 mbar. After cooling to 30° C., methyl t. butyl ether (MTBE) (300 mL/mol) was added. This mixture was extracted 3× with a 5% NaCl solution in water and 2× with a saturated NaCl solution in water. The MTBE was distilled off at 95° C./70 mbar. The remaining water was azeotropically removed with toluene. The mixture was allowed to reach room temperature under nitrogen at atmospheric pressure.
Intermediate INT-3

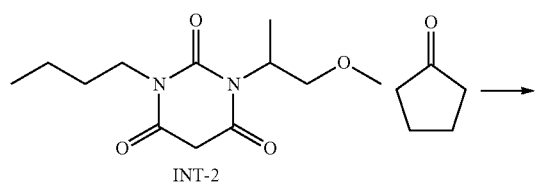

To the residue (INT-2) were consecutively added under a nitrogen blanket at room temperature: cyclopentanone (1.10 eq.), ammoniumacetate (0.07 eq.) and methanol (150 mL/mol). After refluxing for 4.5 hours, methanol was distilled off at 50 mbar. Remaining methanol and water were azeotropically removed with toluene. After cooling to room temperature, toluene (0.108 kg/mol) was added. This solution was filtered on a stainless steel filter covered with silica (30 g/mol). The reactor and the filter cake were washed with toluene (4×50 mL/mol). This solution of INT-3 was directly used in the next step
Intermediate INT-4

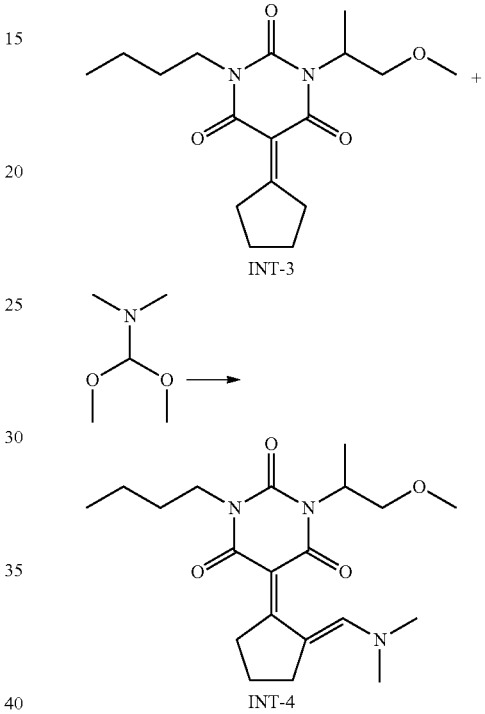

To the toluene solution of INT-3 at room temperature was added acetic acid (1.00 eq.). Under a nitrogen blanket, DMF-DMA (1.13 eq.) was quickly (10 minutes) added at 10° C. After 5 minutes, n. hexane (830 mL/mol) was added, followed by another portion of n. hexane (415 mL/mol) after 30 minutes. After stirring for at least 1 hour (crystallisation) INT-4 is collected by filtration. After washing with n. hexane/toluene (100 mL/mol) and n. hexane (3×125 mL/mol), the product INT-4 was digested with n. hexane (500 mL/mol), filtered and dried at 25° C. for 24 hours.
Intermediate INT-5

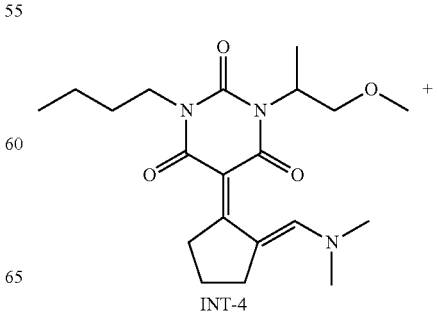

-continued

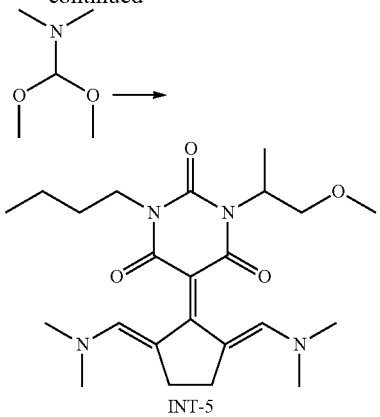

INT-5

To a suspension of INT-4 in ethyl acetate (320 mL/mol) under nitrogen at room temperature was added DMF-DMA (3.49 eq.) in one portion. The mixture was heated to 65° C. and stirred at 65° C. for 25 minutes. While quickly cooling to 15° C., a mixture of MTBE (640 mL/mol) and n. hexane (160 mL/mol) was added. After stirring for 15 minutes, the product was filtered and consecutively washed with ethylacetate/ MTBE 80/20 (200 mL/mol), ethylacetate/n. hexane 80/20 (200 mL/mol), ethylacetate/n. hexane 50/50 (200 mL/mol) and n. hexane (200 mL/mol). The rather unstable product (INT-5) was dried at 25° C. for 24 hours.

The synthesis of intermediate INT-7 was carried out in a cascade mode without purification of the intermediate INT-6 as described below:

Intermediate INT-6

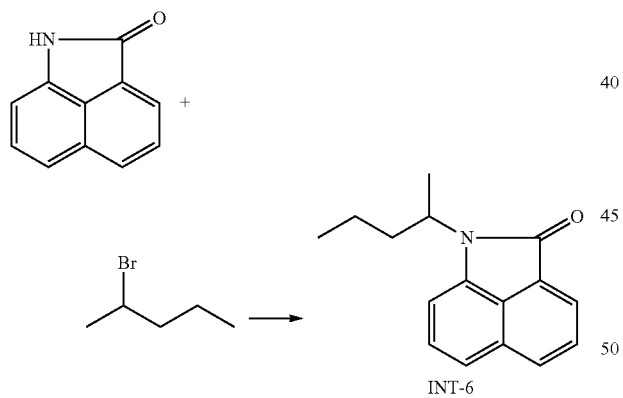

INT-6

To a nitrogen blanketed solution of 1,8-Naphtholactam (1.00 eq.) in sulfolane (250 mL/mol) at 70° C. were added potassium iodide (0.20 eq.) and dimethylaminopyridine (DMAP) (0.135 eq.).

To this mixture was added potassium hydroxide (KOH) (0.60 eq.) and 2-bromo pentane (0.50 eq.).

After 1 hour at 70-75° C. another portion of KOH (0.60 eq.) and 2-bromo pentane (0.50 eq.) were added, while distilling of the pentene side product. This was repeated 2 times. After cooling the reaction mixture was diluted with MTBE (1 L/mol) and washed with water. The water layer was extracted again with MTBE. The combined extracts were washed consecutively with a 15% NaCl solution in water, a 10% NaCl solution in water containing 4% HCl, a 15% NaCl solution in water containing 1% NaHCO3 and a 25% NaCl solution in water. The MTBE was distilled off and the remaining water was azeotropically removed with toluene. The crude INT-6 (oil) was used a such.

Intermediate INT-7

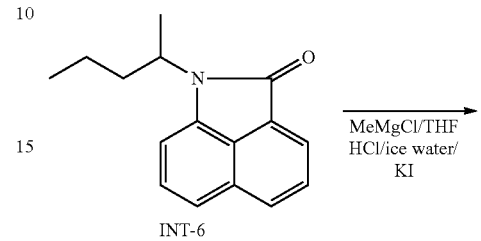

INT-6

INT-7

To nitrogen blanketed solution of INT-6 (1.00 eq.) in THF (100 mL/mol) at room temperature was added methyl magnesiumchloride (1.28 eq.) over 45 minutes (55-60° C.). After stirring for 1 hour at 55° C., the reaction mixture was added to a mixture of HCl (3.9 eq.) in ice water (3.66 kg/mol). After distillative removal of the THF, the aqueous solution was filtered and added to a solution of KI (2.00 eq.) in water (2.1 L/mol). After crystallisation, crude INT-7 was filtered and consecutively washed with water (2.55 L/mol) and ethyl acetate (2.55 L/mol) and dried at 40° C. Yield: 76%

IR-Absorber IR-1

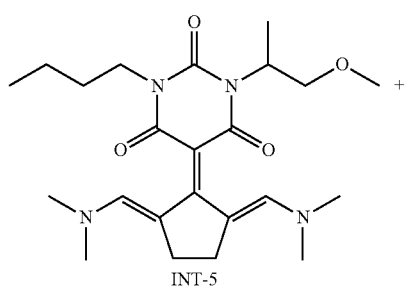

INT-5

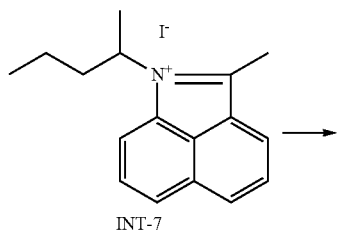

INT-7

IR-1

To a stirred suspension of INT-5 (1.00 eq.) in methyl acetate (4 L/mol) at 50° C., was added in portions INT-7 (2.10 eq.) over 5 minutes. After stirring for 1 hour at 55° C., 2 extra portions of INT-7 (each 0.016 eq.) were added. After stirring for 2.5 hours at 55° C., the reaction mixture was cooled to room temperature. Crude IR-1 was isolated by filtration and washed with ethyl acetate (4 L/mol).

After digestion in water (to remove salts) (4 L/mol), filtering and washing on the filter with water (2 L/mol) and MTBE (1.5 L/mol) the product was dried at 40° C. Yield=92%.

Measurement Methods

1. Optical Density

The optical density was measured in reflection using a spectrodensitometer Type Macbeth TR924 using a visual filter.

Example 1

This example illustrates the security feature of blister formation.

Preparation of PET-C Foil PET1

A coating composition SUB-1 was prepared by mixing the components according to Table 1 using a dissolver.

TABLE 1

| Components of SUB-1 | wt % |
|---|---|
| deionized water | 76.66 |
| CCE | 18.45 |
| resorcinol | 0.98 |
| PAR-sol | 0.57 |
| PEA-sol | 0.68 |
| DOW-sol | 1.33 |
| Surfynsol | 1.33 |

A 1100 µm thick polyethylene terephthalate sheet was first longitudinally stretched and then coated with the coating composition SUB-1 to a wet thickness of 10 µm. After drying, the longitudinally stretched and coated polyethylene terephthalate sheet was transversally stretched to produce a 63 µm thick sheet PET1, which was transparent and glossy.

Preparation of Colourless Colour Forming Layer

A coating composition COL-1 was prepared by mixing the components according to Table 2 using a dissolver.

TABLE 2

| Components of COL-1 | wt % |
|---|---|
| Baysilon | 1.20 |
| MEK | 6.71 |
| UCAR | 56.96 |
| IR-1 | 29.20 |
| HDP | 3.08 |
| CVL | 2.85 |

The coating composition COL-1 was coated with an Elcometer Bird Film Applicator (from ELCOMETER INSTRUMENTS) on the subbed PET-C support PET1 at a coating thickness of 100 µm and subsequently dried for 2 minutes at 20° C. on the film applicator and for a further 15 minutes in an oven at 75° C. to deliver the security film SF-1.

Preparation of Security Document Precursor SDP-1

The security film SF-1 was then laminated onto a 500 µm opaque PETG core from WOLFEN to deliver the security document precursor SDP-1. The lamination was performed using an Oasys OLA6/7 plate laminator with the settings: LPT=115° C., LP=40, Hold=210 sec, HPT=115° C., HP=40 and ECT=50° C.

Evaluation and Results

A test image containing a wedge with different grey-levels (ten squares of 7×9 mm) was laser marked on the security document precursor SDP-1 through the PET-C foil using a Rofin RSM Powerline E laser (10 W) with settings 33 ampere and 44 kHz. No blisters were observed in the first seven squares.

The laser marked SDP-1 was then lasermarked for a second time on the same squeres in the same way. The results are given by Table 3.

TABLE 3

| Square | Original optical density on first lasermarking | Optical density after second lasermarking | Blister visible after second lasermarking? |
|---|---|---|---|
| 1 | 0.31 | 0.32 | No |
| 2 | 0.34 | 0.37 | No |
| 3 | 0.36 | 0.41 | No |
| 4 | 0.41 | 0.53 | Yes |
| 5 | 0.54 | 0.91 | Yes |
| 6 | 0.69 | 1.18 | Yes |
| 7 | 0.94 | 1.40 | Yes |

From Table 3, it should be clear that tampering of a laser marked security document is made visible by the occurrence of blisters.

Example 2

This example illustrates the identification of the compound having a melting temperature of less than 20° C. inside a blister, using the same security document precursor of Example 1.

Evaluation and Results

The security document precursor of Example 1 was lasermarked in the same way as in Example 1 to obtain 60 blisters having a size of 5×5 mm². The security document precursor with the 60 blisters was cut up and collected into a 10 ml headspace vial. A reference vial was filled with the same amount of non-lasermarked security document precursor. Both vials andan empty vial were closed and purged with He for 30 seconds at a flow rate of 100 ml/min. Both vials were then incubated for 20 minutes at 100° C.

GCMS-structure analysis was performed using coupled GC and MS apparatus Agilent™ 6890 and Agilent™ 5793 equipped with a column Db-xlb 30 m×0.25 mm df:0.25 µm using as carrier He at a flow rate of 1.2 ml/min at injection split of 10/1 and an oven at 40° C. for 1 min and a gradient of 15° C./min to 300° C., and electron impact detection for MS.

The detector response at 44Da ($CO_2$) and 56Da (isobutene) is given by Table 4.

TABLE 4

| Vial | 44 Da | 56 Da |
|---|---|---|
| empty | 774 | 0 |
| non-laser marked SDP-1 | 28813 | 3107 |
| laser marked SDP-1 with blisters | 311579 | 256177 |

From Table 4, it should be clear that the compound having a melting temperature of less than 20° C. was $CO_2$ and isobutene. In addition, weaker signals were observed for tert. butanol, tert. butylchloride and MEK (=residual coating solvent). The $CO_2$ and isobutene were produced from the fragmenting groups tBOC present in the hydrogen donor-precursor HDP.

The invention claimed is:

1. A security document precursor including, in order, at least:
   a) a transparent biaxially stretched polyethylene terephthalate foil;
   b) a colourless colour forming layer containing at least an infrared absorber, a colour forming component and a polymeric binder; and
   c) a polymeric support;
   wherein the colourless colour forming layer contains at least one component forming a compound having a melting temperature of less than 20° C. upon laser marking the colourless colour forming layer with an infrared laser.

2. The security document precursor according to claim 1 wherein the component forming a compound having a melting temperature of less than 20° C. is a colourless dye-precursor which forms a coloured dye by fragmentation.

3. The security document precursor according to claim 1 wherein the component forming a compound having a inciting temperature of less than 20° C. is a hydrogen donor precursor.

4. The security document precursor according to claim 3 wherein the hydrogen donor precursor is 4,4'-Bis(tert-butoxycarbonyloxy)diphenylsulfone.

5. The security document precursor according to claim 4 wherein the colour forming component is crystal violet lactone.

6. The security document precursor according to claim 3 wherein the colour forming component is crystal violet lactone.

7. The security document precursor according to claim 1 wherein the component forming a compound having a melting temperature of less than 20° C. is a thermal acid generating component.

8. The security document precursor according to claim 1 wherein the compound having a melting temperature of less than 20° C. includes $CO_2$ and/or an alkene.

9. The security document precursor according to claim 1 wherein the polymeric support is a biaxially stretched polyethylene terephthalate foil.

10. The security document precursor according to claim 1 further including an RFID chip and/or a contact chip.

11. A security document including the security document precursor according to claim 1.

12. A method for securing a security document including the steps of:
   1) providing a security document precursor including, in order, at least:
      a) a transparent biaxially stretched polyethylene terephthalate foil;
      b) a colourless colour forming layer containing at least an infrared absorber, a colour forming component and a polymeric binder; and
      c) a polymeric support; and
   2) laser marking the colourless colour forming layer with an infrared laser,
   wherein the colour forming layer contains at least one component forming a compound having a melting temperature of less than 20° C. upon laser marking the layer with an infrared laser.

13. The method according to claim 12 wherein the component forming a compound having a melting temperature of less than 20° C. is selected from the group consisting of a colour forming component forming a coloured dye after fragmentation, a hydrogen donor precursor, and a thermal acid generating component.

14. The method according to claim 13 wherein the hydrogen donor precursor is 4,4'-Bis(tert-butoxycarbonyloxy)diphenylsulfone.

15. The method according to claim 12 wherein the compound having a melting temperature of less than 20° C. includes $CO_2$ and/or an alkene.

* * * * *

UNITED STATES PATENT AND TRADEMARK OFFICE
CERTIFICATE OF CORRECTION

| | | |
|---|---|---|
| PATENT NO. | : 8,975,211 B2 | Page 1 of 1 |
| APPLICATION NO. | : 13/885750 | |
| DATED | : March 10, 2015 | |
| INVENTOR(S) | : Bart Waumans et al. | |

It is certified that error appears in the above-identified patent and that said Letters Patent is hereby corrected as shown below:

Claims

At col. 21, lines 39–40, claim 3, please delete "inciting" and insert --melting--.

Signed and Sealed this
Twenty-fourth Day of November, 2015

Michelle K. Lee
*Director of the United States Patent and Trademark Office*